Nov. 4, 1969        J. T. DUNTON        3,475,978
FIRE HYDRANT

Original Filed Jan. 18, 1965

INVENTOR.
JOHN T. DUNTON
BY
ATTORNEY.

Nov. 4, 1969     J. T. DUNTON     3,475,978
FIRE HYDRANT
Original Filed Jan. 18, 1965     2 Sheets-Sheet 2
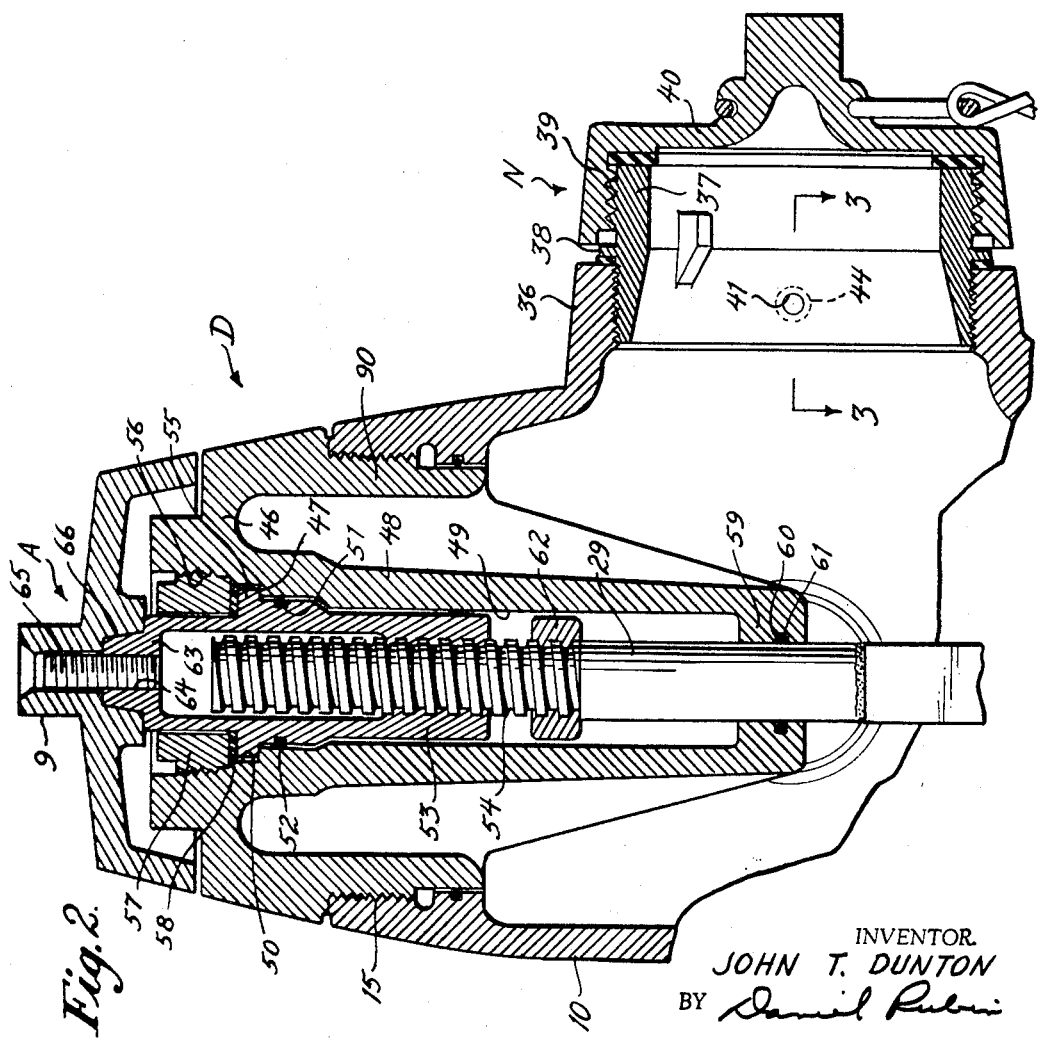
INVENTOR.
JOHN T. DUNTON
BY Daniel Rubin
ATTORNEY.

United States Patent Office 3,475,978
Patented Nov. 4, 1969

3,475,978
FIRE HYDRANT
John T. Dunton, Bradford, Pa., assignor to Dresser Industries, Inc., Dallas, Tex., a corporation of Delaware
Continuation of application Ser. No. 678,138, Sept. 20, 1967, which is a division of application Ser. No. 421,580, Jan. 18, 1965. This application Nov. 18, 1968, Ser. No. 778,007
Int. Cl. F16h 27/02, 1/18
U.S. Cl. 74—89.15                    4 Claims

ABSTRACT OF THE DISCLOSURE

A fire hydrant having an improved mechanism for operating the hydrant between open and closed positions. A pressure plate receiving the valve stem is secured to the upper bonnet and provides a bearing shoulder against which the actuator is secured for rotation movement by means of a retaining nut.

---

This application is a continuation of Ser. No. 678,138 filed Sept. 20, 1967, which in turn is a division of application Ser. No. 421,580, filed Jan. 18, 1965, both now abandoned.

The present invention relates to a fire hydrant and is concerned primarily with certain improvements which result in improved utility of such hydrants.

It is an object of the invention to provide an improved hydrant actuating mechanism. In accordance therewith, the upper end of the valve stem is threaded and is received in a threaded stem actuator which when rotated moves the stem longitudinally either upwardly or downwardly. In order for this operation to take place a pressure plate which is integral with the bonnet closes the upper end of the casing. This pressure plate is formed with a shoulder that is engaged by a flange on the actuator and another object of the invention is to provide a self-lubricating thrust bearing such as a Teflon ring between the retaining nut and the flange.

Another object of the invention is to provide a new and improved bonnet which is secured to the upper casing part. This bonnet has an externally threaded skirt that is screwed into the upper casing part and the pressure plate aforesaid is integral with said skirt.

The pressure plate is formed with a sleeve which depends from the shoulder aforesaid and which receives the valve stem in spaced relation. The lower end of this sleeve is formed with an inwardly extending flange which snugly receives the valve stem.

A bonnet or dome is formed with a central opening over the stem actuator and retaining nut. An object of the invention is to provide a closure for this opening in the form of a dust cap that is held in position by a screw bolt passing through the cap and screwed into the stem actuator. This bolt may be removed to permit the introduction of lubricant into the actuating mechanism at the top.

For a full and more complete understanding of the invention reference may be had to the following description and accompanying drawings, wherein:

FIGURE 2 is a sectional view on an enlarged scale for the upper end of the hydrant.

FIGURE 3 is another detail partly in section and partly in elevation showing the stop nut on the valve stem in one limit.

THE GENERAL ASSEMBLY

Figure 1:
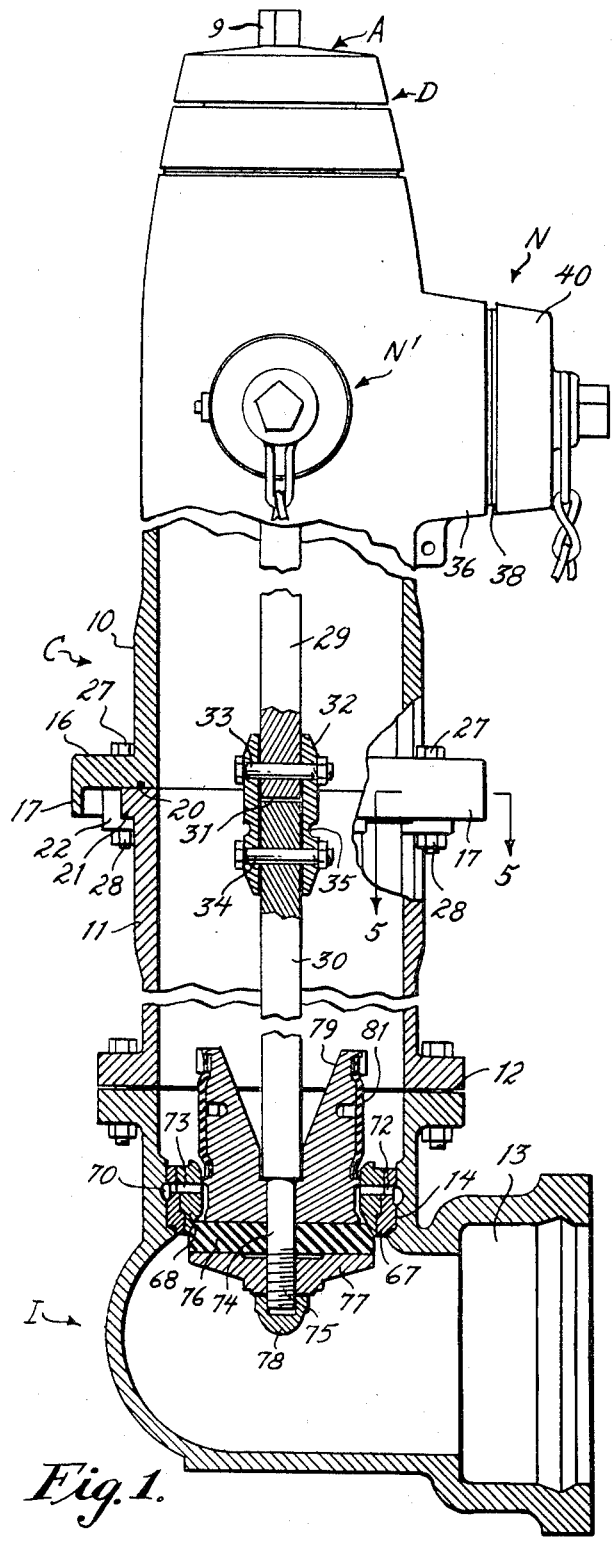
FIGURE 1 is a side view partly in section and partly in elevation and with parts of the casing broken away, of a fire hydrant embodying the improvements of this invention.

A fire hydrant embodying the improvements of this invention comprises a casing which is referred to in its entirety by the reference character C. This casing C comprises an upper casing part 10 and a lower casing part 11. The parts are secured together by a frangible connection to be later described in detail. Secured to the lower end of the lower casing part 11 by a bolted flange connection 12 is an intake shoe I. The shoe I includes an intake opening at 13 which is connected to a water main and has a cylindrical bore 14 which receives a valve seat which will be later described.

The upper caisng part 10 carries a plurality of discharge nozzles, each of which is referred to in its entirety by the reference characters N and N' which are in right angular relation. Secured to the upper end of the upper casing part 10 by a threaded connection 15 is a dome D which in turn carries a dust cap A.

THE FRANGIBLE CONNECTIONS

Referring now to FIGURE 1, integrally formed with the upper casing part 10 and at the lower end thereof is a comparatively wide outwardly extending flange 16 which in turn carries a depending skirt 17. The flange 16 is formed with a series of bolt holes 18. The lower end face of the casing part 10 has an annular groove 19 which receives an O-ring packing member 20 that engages the upper end face of the lower casing part 11.

The upper end of the lower casing part 11 is formed with a comparatively narrow outwardly extending flange 21 that is spaced from the skirt 17. A plurality of lugs 22 are received in this space, the number of lugs corresponding to the number of bolt holes 18. The top face of each lug has an inward draft or incline so that only the radially outer edge of each lug engages the underface of the flange 16. Further details are disclosed in copending divisional continuation-in-part application Ser. No. 687,940.

A valve stem comprises an upper stem part 29 and a lower stem part 30, both of non-circular cross section such as the square shape illustrated. These stem parts have confronting end faces at 31. A connecting sleeve 32 is connected to the upper stem part 29 by a bolt 33 and the lower stem part 30 by a bolt 34. The sleeve 32 has a bore corresponding in cross section to that of the stem. This sleeve 32 is weakened by an annular groove 35 which will be noted is offset from the confronting end faces 31. This offset affords increased operational strength yet provides for the breaking of the stem parts when the set is broken. The non-circular cross section of the stem parts and sleeve establishes the driving relation between the stem parts.

THE ACTUATING MECHANISM

In accordance with the invention hereof, the dome or bonnet D comprises a skirt 90 that is externally threaded with the threads being received in internal threads formed in the upper casing part 10 to achieve the threaded connection 15.

Integrally formed with the skirt 90 is a pressure plate 46 formed with an annular shoulder 47. Depending from this shoulder 47 is a sleeve 48 providing a bore 49 and a counterbore 50 separated by the shoulder 47. A stem actuator 53 is screwed onto the upper end of the valve stem part 29 which is threaded such as indicated at 54. The stem actuator 53 is formed with an annular groove 51 which receives an O-ring 52. The O-ring 52 provides an effective seal between the stem actuator and pressure plate sleeve 48.

The stem actuator 53 is formed with an outwardly extending flange 55 which engages the shoulder 17. The dome or bonnet is formed with a threaded opening at 56 which receives a retaining nut 57. A Teflon thrust bearing 58 is interposed between the nut 57 and the flange 55. This Teflon thrust bearing is self-lubricating and serves to reduce friction created by upward thrust of the stem actuator.

The Teflon ring provides three advantages over any existing design, namely: (1) It provides low turning torque with a corrosion resistant material. (2) There is no requirement for lubrication. (3) No danger of seizing due to the failure of the material.

The lower end of the sleeve 48 is formed with an inwardly extending flange 59 which defines an opening snugly receiving the valve stem 29. The flange 59 is formed with an annular groove 60 which receives an O-ring packing member 61. The latter provides an effective seal at the lower end of the sleeve 48. The valve stem 29 also carries an abutment nut 62 which is adapted to engage the flange 59 as shown in FIGURE 3 to limit lower movement of the valve stem caused by rotation of the actuator 53.

The actuator 53 is closed at its upper end by a top wall 63 formed with a threaded opening 64. The dust cap A is removably secured in position on the top of the dome over the opening 56 by a screw bolt 65. This screw bolt 65 may be removed to permit the introduction of lubricant through the opening 64 to the space in the aperture over and about the threaded end of the valve stem 29. The top plate 63 of the actuator 53 is provided with non-circular surfaces at 66 which in turn fit the corresponding surfaces on the dust cap A. The latter is formed with wrench engaging surfaces 9. Thus, the dust cap may be rotated to rotate the actuator.

The intake shoe I is operated by rotation of the valve stem and is formed with an inwardly opening annular groove 70 which communicates with the exterior of the intake I through the medium of a drainage port 8. The seat carriers 67 and 68 are formed with aligned ports 72 and 73 which communicate with the groove 70. Thus, when the inner end of the port 73 is opened, communication between the interior of the casing and exterior of the intake shoe is provided and any water retained in the casing will be drained off through ports 72 and 73, groove 70, and drainage port 8.

The lower valve stem part 30 is reduced at 74 and the lower end of this reduced portion is threaded at 75. Mounted on this reduced stem part 74 is a main valve 76 which is held in position by a retaining plate 77 and lock nut 78 with a gasket interposed between the latter to prevent corrosion of threads 75. Further details of the valve stem are disclosed in copending divisional application Ser. No. 678,139 filed Sept. 20, 1967.

While preferred specific embodiments of the invention are hereinbefore set forth, it is to be clearly understood that the invention is not to be limited to the exact constructions, mechanisms, and devices illustrated and described because various modifications of these details may be provided in putting the invention into practice within the purview of the appended claims.

I claim:
1. In a fire hydrant including an internally threaded upper casing part and a threaded valve stem, a dome comprising an externally threaded skirt screwed into said upper casing part, a pressure plate integral with said skirt, a sleeve integral with and depending from said pressure plate, and said sleeve having a bore receiving the threaded portion of said valve stem and a counterbore, there being a shoulder between said bore and counterbore, a valve actuator in said bore in threaded engagement with said valve stem, an outwardly extending flange on said actuator cooperating with said shoulder, said pressure plate being formed with a threaded opening above said counterbore, and a retaining nut screwed into said opening and engaging said flange.

2. The fire hydrant of claim 1 in which there is a self-lubricating bearing between the actuator flange and said retaining nut.

3. The valve actuator of claim 1 in which there is an O-ring seal between said actuator and sleeve adjacent to the upper end thereof.

4. In a fire hydrant for dispensing of fluid line content including a threaded upper casing part and a threaded valve stem extending axially of said casing part, a dome comprising a threaded skirt in threaded relation to said upper casing part, a pressure plate integral with said skirt defining an axial bore receiving the threaded portion of said valve stem and terminating in the vicinity of the fluid dispensing path and a counterbore thereabove with a radial shoulder between said bore and counterbore, seal means maintaining a fluid tight relation between said axial bore and the fluid dispensing path thereat, a valve actuator in said bore in threaded engagement with said valve stem, a radially outwardly extending flange on said actuator having a face cooperating with a face on said shoulder, and means carried by said pressure plate to axially hold the face of said flange against the face of said shoulder.

References Cited

UNITED STATES PATENTS 930,080   10/1909   Schreidt _____ 251—268

FRED C. MATTERN, JR., Primary Examiner

F. D. SHOEMAKER, Assistant Examiner

U.S. Cl. X.R.

74—424.8; 251—268